United States Patent [19]
Kawakami et al.

[11] Patent Number: 4,725,149
[45] Date of Patent: Feb. 16, 1988

[54] AUTOMATIC DISSOLVING DEVICE

[75] Inventors: Taichi Kawakami, Ashikaga; Hiroshi Shintate, Yono, both of Japan

[73] Assignees: Kabushiki Kaisha Kawakami Tekkosho; Nippon Kayauk Kabushiki Kaisha, both of Tokyo, Japan

[21] Appl. No.: 890,960

[22] PCT Filed: Nov. 15, 1985

[86] PCT No.: PCT/JP85/00639
§ 371 Date: Jul. 16, 1986
§ 102(e) Date: Jul. 16, 1986

[87] PCT Pub. No.: WO86/02960
PCT Pub. Date: May 22, 1986

[30] Foreign Application Priority Data
Nov. 16, 1984 [JP] Japan ................... 59-173145

[51] Int. Cl.$^4$ ............................. B01F 13/08
[52] U.S. Cl. ............................ 366/141; 366/142; 366/146; 366/160; 366/177; 366/273
[58] Field of Search ............ 366/18, 76, 16, 132, 366/141, 142, 146, 151–153, 160–162, 177, 182, 273, 274; 222/58, 1, 63; 137/403, 406, 407

[56] References Cited
U.S. PATENT DOCUMENTS
2,900,176  8/1959  Krogel .
4,252,139  2/1981  Davis et al. .

FOREIGN PATENT DOCUMENTS
57-66171  4/1982  Japan .
58-41966  3/1983  Japan .

Primary Examiner—Timothy F. Simone
Attorney, Agent, or Firm—Birch, Stewart, Kolasch & Birch

[57] ABSTRACT

An automatic dissolving device for dyes or the like according to the present invention comprises:
  (1) an electromagnetic valve situated midway in a pipeline from a medium or stock solution tank to a dissolving or mixing vessel,
  (2) a turntable with a number of holes around the circumference to accept a number of dissolving or mixing vessels,
  (3) an electronic type balance below the turntable to weigh the dissolving or mixing vessels and one or more magnet-type stirring devices arranged below the turntable so as to stir the solution in the dissolving or mixing vessel, and
  (4) a mathematical operation control device, so as to enable the solution of dyes or the like accurately and automatically and under a sufficiently stirred state without requiring much time and skill.

8 Claims, 4 Drawing Figures

AUTOMATIC DISSOLVING DEVICE

BACKGROUND AND SUMMARY OF THE INVENTION

1. Technical Field

The present invention relates to a dissolving device for automatically preparing solutions of dyes for use in various dyeing experiments.

2. Background Art

Operations for dissolution (dissolution means in this invention both dissolution of water-soluble dyes and dispersion of water-insoluble dyes such as disperse dyes) of dyes and the like have been carried out by a manual operation performed by workers using a balance, a messflask, a dissolving vessel, an agitating device, etc. which includes operations for accurate sampling of dyes or the like, accurate charging of media (media mean in this invention water, as well as organic solvents containing water), an agitating operation for dissolving them and other such operations which require much time and skill in order to obtain the required accuracy. And further, the thus obtained dye solutions tend to cause precipitation, coagulation, etc. till they are utilized for actual dyeings and, particularly, when it is required to prepare a number of dye solutions, operations from the dissolving work of dyes to the actual dyeing operation inevitably become complicate.

Accordingly, there has been a need for a dissolving device that does not require much time and skill and can provide an accurate sampling amount, as well as can obtain a stable solutions of dyes and the like in which the obtained solutions do not coagulate or the like.

Disclosure of Invention

The present inventors have continued an earnest study for solving the foregoing problems which have led to the developments of the present invention.

Thus, the present invention relates to an automatic dissolving device for dyes comprising:

(1) an electromagnetic valve situated midway in a pipeline from a medium or stock solution tank to a dissolving or mixing vessel, (2) a turntable with a number of holes disposed around the circumference thereof to accept a number of dissolving or mixing vessels, (3) an electronic type balance disposed below the turntable to weigh the dissolving or mixing vessels, and one or more magnet-type stirring devices arranged below the turntable for stirring the solutions in the dissolving or mixing vessels, and (4) a mathematical operation control device.

It is possible by using such a device to prepare stable solutions of dyes or the like automatically and successively while shortening the working time, requiring no operator's skill, at an accurate weighed amount and causing no changes such as precipitation or coagulation during storage until actual dyeings. The application of the automatic dissolving device according to the present invention is not restricted to dissolutions of dyes but is also applicable to the preparation of solutions consisting of dyes and dyeing auxiliaries such as sodium sulfate and soda ash, or to the preparations of solutions consisting only of dyeing auxiliaries.

In the present invention, the tare of the dissolving vessel (receiver vessel) situated in the holes of the turntable are at first measured by the electronic type balance disposed below the turntable and then an eye-measured dye is charged thereto and the weight of the vessel containing the dye is again measured, whereby the amount of the weighed dye is exactly calculated by the mathematical operation control device interlocking with the electronic type balance. Then, after rotating the turntable to another position and adding a medium controlled to a predetermined amount by the mathematical operation control device by opening the electromagnetic valve situated midway in a pipeline from a medium tank to the receiving (dissolving) vessel, the dye is dissolved by the stirring conducted by a number of magnet-type stirring devices also arranged below the turntable. Thereafter, the solution containing the dye is stirred by another magnet-type stirring device arranged below the turntable in order to keep the solution stable. By repeating the above-mentioned procedures using a number of receiving vessels while successively turning the turntable, solutions of a number of dyes can be prepared.

The solution thus prepared containing a dye or the like can be utilized for dyeing, or the solution thus obtained may be used as a stock solution for preparing a mixed solution. That is, solutions of dyes or the like of known concentrations prepared as described above, and contained in a number of vessels as stock solutions (stock solution tanks) are discharged from the tanks in predetermined amounts into dissolving vessels (mixing vessels) to prepare a mixed solution of predetermined composition and concentration. In such a case, it is desirable to utilize a magnet-type stirring device for preventing dyes or the like from precipitating and coagulating below the stock solution tanks.

It is necessary on the automatic dissolving device according to the present invention to bring the receiving vessel, the electronic type balance and the magnet-type stirring device into contact with each other or adjacent to each other and, as methods therefor, a method of vertically moving the turntable on which the receiving vessels are disposed or a method of vertically moving the electronic type balance and the magnet-type stirring device may be employed.

In the automatic dissolving device according to the present invention, vessels made of plastics, glass, porcelain and iron can be used as the medium or stock solution tank, as the vessel or as the mixing vessel. Vessels made of plastics, include, for example, a vessel made of polypropylene or the like.

While iron, teflon-coated iron, plastics and the like can be used as a material for the pipeline, transparent or semi-transparent plastics, particularly, teflon is preferred because of easy of fabrication.

Electromagnetic valves made of iron, teflon-coated iron or copper can be used for providing acid-resistance and thus any of the commercially available products can be used as long as the valve can be correctly opened and closed by electrical signals from the mathematical operation control device.

For the electronic type balance, those having a the function of converting weighed values into electrical signals and sending them to the mathematical operation control device are used and the usual commercially available electronic type balances can be preferably used since they have such a function. However, those electronic type balance devices having no such function thereto can also be used by attaching such a function. The electronic type balance is described, for example, in Analytical Chemistry, Vol. 19, p 262–303, etc. and such commercial products are easily available at present.

Turntables made of iron and plastics can be used and, particularly, those made of glass fiber-reinforced plastics are preferred.

The magnet-type stirring device has a magnet directly coupled with a motor which rotates or stops depending on signals from the mathematical control device. While commercially available magnetic stirrers can usually be used as they are, those capable of controlling the rotating speed by electrical signals are preferred. The medium or the stock solution in the medium or stock solution tank is spontaneously discharge by opening the electromagnetic valve for a predetermined time, and it is also possible to accelerate the speed of discharge by adding air pressure of about 0.01 to 0.1 kg/cm$^2$ as required, to the inside of the medium tank or the stock solution tank.

The mathematical operation control device has the function of centrally controlling the electromagnetic valve, the turn table, the electronic type balance, the magnet-type stirring device, etc. and the program for obtaining a solution at a predetermined concentration is incorporated in a conventional manner. The basic procedures in preparations of solutions controlled by the mathematical operation control device are as follows. That is, a predetermined concentration of dyes or the like is first inputted to and stored in the mathematical operation control device. Then, after weighing the tare of the dissolving vessel on the turntable by the electronic type balance, it is stored in the mathematical operation control device. Then, the dye or the like charged by an eye-measured amount to the vessel is weighed accurately and then a solvent is discharged into the vessel by opening the electromagnetic valve till the stored predetermined concentration is attained. After the solution at the predetermined concentration has been obtained, the dissolving vessel is introduced into the magnet-type stirring device by moving the turntable and the stirring is started to dissolve the dye or the like.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

BEST MODE FOR CARRYING OUT THE INVENTION

The present invention will now be explained more concretely by referring to the accompanying drawings.

Figure 1:
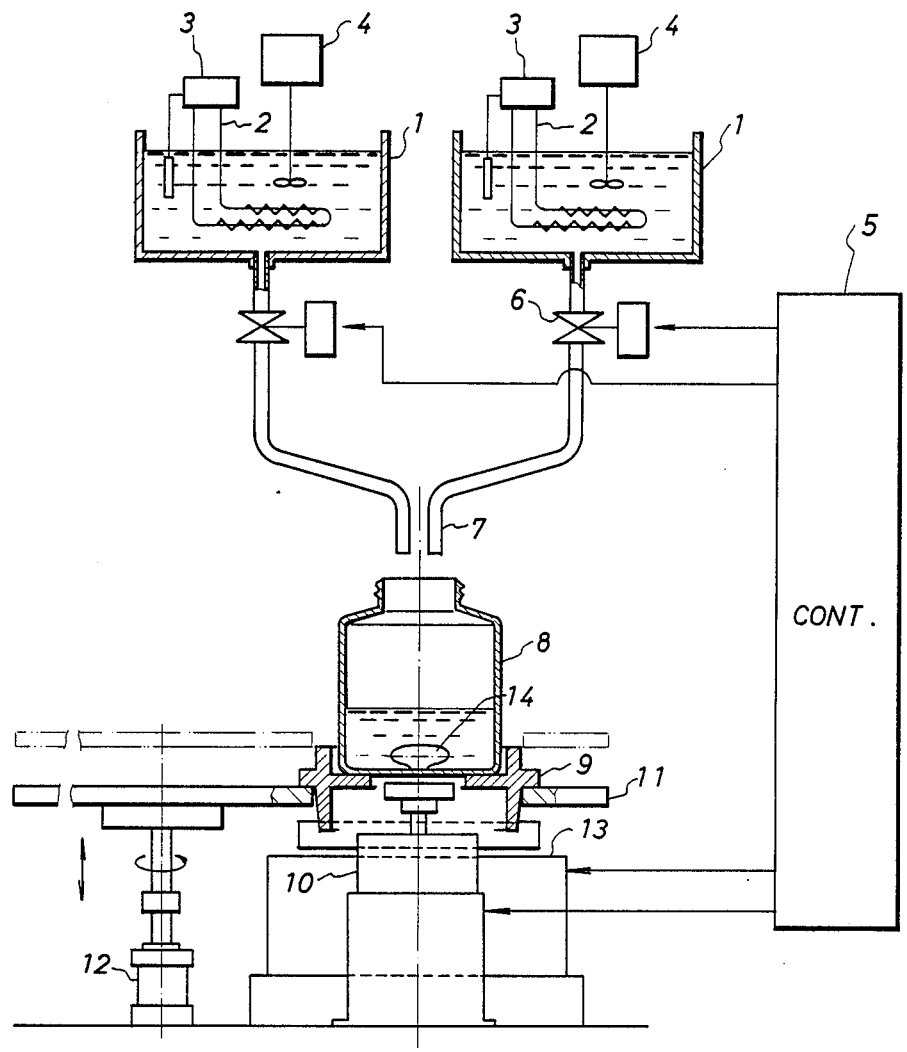
FIGS. 1 through 3 are views for the present invention.

FIG. 1 is a view of one mode of the present invention. In this embodiment, the turntable 11 is moved vertically so that the height of the turntable may be adjusted to the height of the electronic type balance and the magnet-type stirring device.

In FIG. 1, element 1 represents medium tanks made of SUS, which are illustrated, for example, in a dual system, so that two kinds of media can be used. The immersing type electrical heater 2 is attached to the medium tank so as to maintain the medium temperature constant. The medium temperature can be controlled by the thermostat 3. The medium is stirred by a blade-type stirring device 4. The electromagnetic valve 6 is opened or closed by an electrical signal from the mathematical operation control device 5 and, after discharging the medium from the medium tank into the dissolving vessel 8, the dissolution is promoted by the magnet-type stirring device 10 disposed below the turntable 11.

Figure 2:
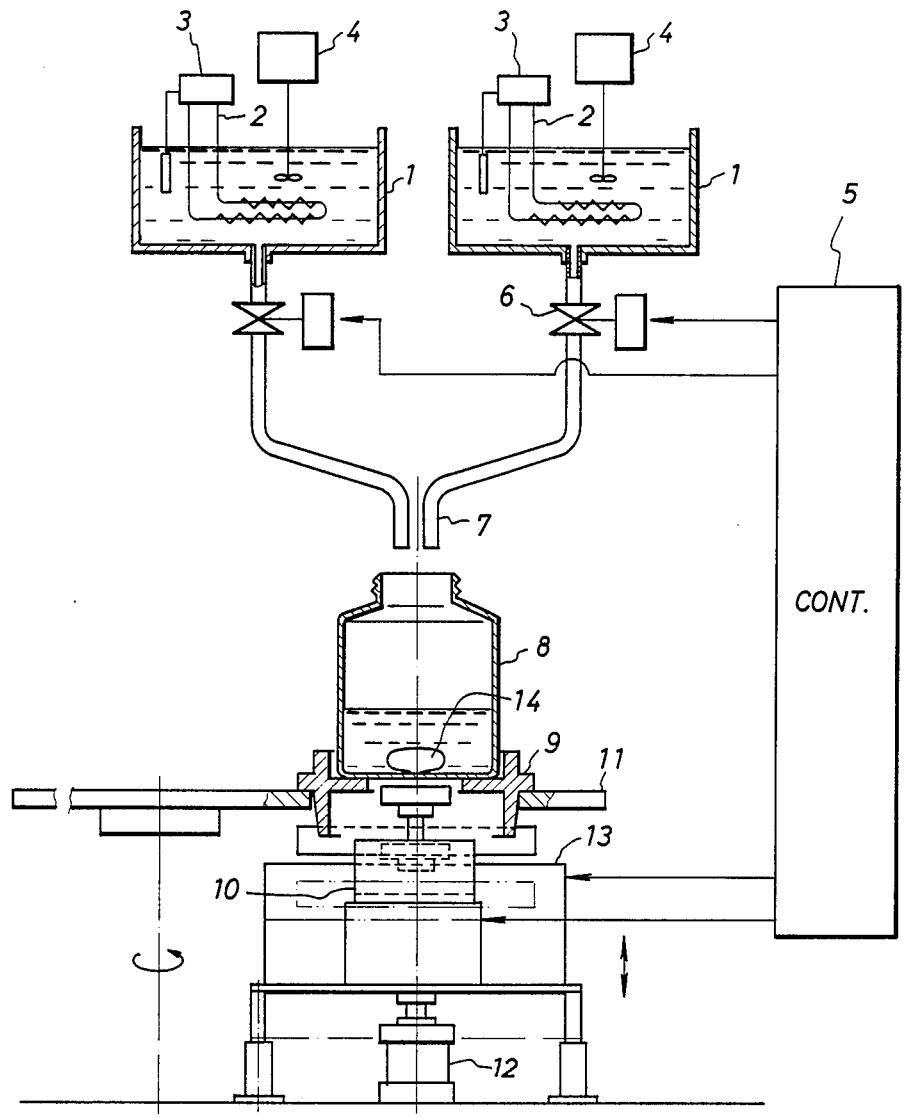

FIG. 2 is another mode of practicing the present invention. In this embodiment, the turntable 11 is fixed, while the electronic type balance 13 and the magnet-type stirring device 10 are caused to move vertically.

In FIG. 2, 1 represents medium tanks made of SUS which are illustrated for example, in a dual system so that two kinds of the media can be used. The immersing type electrical heater 2 is attached to the medium tank so as to maintain the medium temperature constant and the medium temperature can be controlled by the thermostat 3. The medium is stirred by the blade-type stirring device 4. The electromagnetic valve 6 is opened or closed by an electrical signal from the mathematical operation control device 5, and the medium in the medium tank is discharged in a previously indicated amount from the discharge nozzle 7 into the receiving vessel 8.

Figure 3:
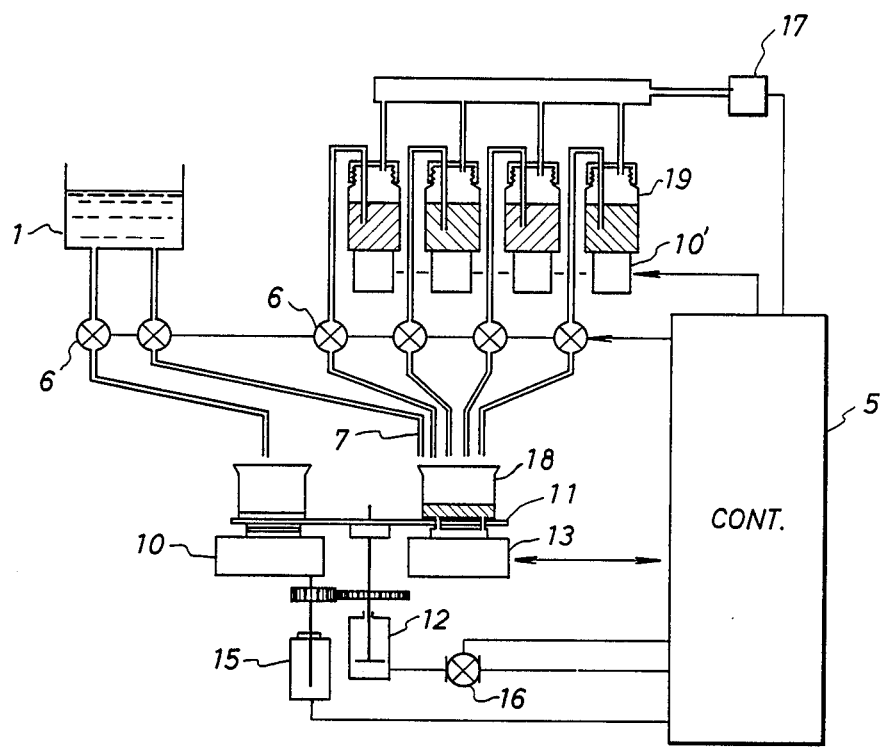

FIG. 3 shows a further mode of practicing the present invention. In this embodiment, the electronic type balance device 13 and the magnet-type stirring device 10 are fixed, while the turntable 11 is moved vertically.

In FIG. 3, element 19 represents a stock solution tank and element 18 represents a receiving vessel (mixing vessel). Further, element 17 represents an air pump for applying air pressure to the stock solution tank and element 10' represents a magnet-type stirring device for stirring the stock solution. Element 16 represents an ON-OFF valve for supplying pressurized air to the air cylinder 12. Element 15 represents a motor for rotating the turntable 11. Since air pressure is applied to the stock solution tank 19 in this embodiment, the stock flows down more rapidly.

Figure 4:
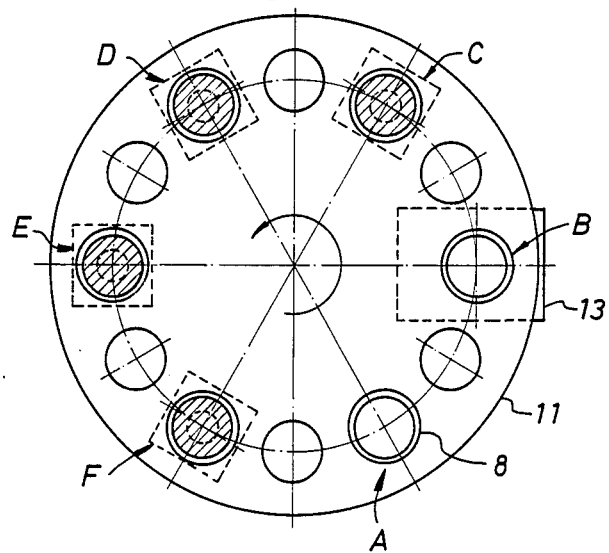
FIG. 4 is a plan view for the turntable, showing the order of dissolving the dye or the like according to the present invention.

FIG. 4 schematically shows the order of dissolving the dye or the like in the present invention, according to which the dye or the like is eye-measured and manually charged to the inside of the receiving vessel 8 at the position A placed at the holes of the turntable 11. After the charging operation has been completed, the turntable is rotated and, at the position B, an accurate weight for the charged dye or the like is measured by the electronic type balance 13 and the measured weight is stored in the memory means in the mathematical operation control device. Then, the turntable is rotated and, at the position C, the prescribed amount of a medium is discharged depending on the weighed dye or the like so as to form a previously indicated concentration of a solution of the dye or the like. Successively, the stirring is started by the magnet-type stirring devices disposed below the turntable to promote the dissolution of the dye or the like. The magnet-type stirring devices are also disposed at the positions D, E and F, and the receiving pan 9 for the receiving vessel is held at the center so that the rotating magnet 10 of the magnet-type stirring device can be situated just below the receiving vessel 8, for example, as shown in FIGS. 1 and 3. Thus, effective stirring treatment may be performed when the receiving vessels on the turntable arrive at the respective positions and the turntable is moved downwardly. In the device shown in FIG. 2, when the receiving vessels on the turntable are rotated to the predetermined positions, the electronic type balance and the magnet-type stirring devices move upwardly to accurately measure the amounts of dyes or the like and to stir the solution of dyes or the like.

In this way, the turntable stops at each of the positions A, B, C, D, E and F (FIG. 4) and each of the processings for measurement, dissolution and stirring is continuously carried out. While FIG. 4 shows a turntable with six receiving vessels the number of receiving vessels may be increased as required.

In the case of a resin-made dissolving vessel which is charged electrostatically, a charge eliminating device is preferably disposed just before the position B (on the side of position A) in FIG. 4, for preventing the bad effect of static electricity on the electronic-type balance. Furthermore, a spacer made of a plastic may be disposed between the dissolving or mixing vessel and the electronic type balance such that the magnetic force possessed by the rotor give no adverse effect on the electronic type balance.

Industrial Applicability

The dissolution of dyes or the like accurately and automatically and in a well stirred state is made possible without requiring much time and skill.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

We claim:

1. An automatic dissolving device comprising:
at least one tank for receiving a liquid,
a turntable containing a plurality of holes disposed along the circumference thereof;
a plurality of vessels, each arranged in the holes for receiving a material to be mixed,
a pipeline connected at one end to the tank for discharging said liquid therefrom, and at the other end to said plurality of vessels for transferring said liquid discharged from the tank through said pipeline to said vessels,
an electromagnetic valve disposed on the pipeline,
an electronic type balancing means arranged at a first predetermined position and below a passageway through which the holes pass in rotation of the turntable for weighing a tare of the vessel to thereby deliver a first signal indicating the tare and for weighing the vessel in which the material is received to thereby deliver a second signal corresponding to the weight of the material,
rotating means connected to the turntable for rotating the turntable,
a magnet-type stirring device arranged below the passageway and at a second predetermined position to perform the mixing of the material with the liquid by rotating a magnet disposed in the vessel by magnetic force through the bottom wall of the vessel, and
a control device for delivering respectively, third and fourth signals at the first predetermined position and a third predetermined position to the rotating means to rotate the turntable to thereby move the vessel from the first predetermined position to the third position and from the third position to the second position;
means for determining the weight of the material as such received in the vessel based on the first and second signals;
means for delivering a fifth signal to the electromagnetic valve to open the valve for a time interval determined from the thus determined weight when the vessel reaches the third predetermined position, and
means for delivering a sixth signal to the magnet-type stirring device to operate the magnet-type stirring device when the vessel reaches the second predetermined position.

2. The device according to claim 1 wherein a plurality of the tanks are provided together with a corresponding number of pipelines and electromagnetic valves.

3. The device according to claim 1 wherein the tank is provided with an immersing type electrical heater for maintaining the temperature of the liquid constant, a thermostat for controlling the temperature, and a blade-type stirring device for stirring the liquid.

4. The device according to claim 1 wherein the turntable is fixed, but means are provided for moving the electronic type balance and the magnet-type stirring device in the vertical direction.

5. The device according to claim 1 wherein the electronic type balance and the magnet-type stirring device are fixed, and means are provided for moving the turntable in the vertical direction.

6. The device according to claim 1, which further comprises air supplying means for accelerating the flow of the liquid through the electromagnetic valve by adding air pressure to the inside of the tank, and a magnet-type stirring device for stirring the liquid in the tank.

7. The device according to claim 1 which further comprises a pan for holding the vessel so that a rotating magnet of the magnet-type stirring device can be situated just below the vessel.

8. The device according to claim 1, in which a plurality of the magnet-type stirring devices are arranged with equal angular distance from each other below the passageway defined by a one-half rotation of the turntable from the second predetermined position.

* * * * *

UNITED STATES PATENT AND TRADEMARK OFFICE
CERTIFICATE OF CORRECTION

PATENT NO. : 4,725,149

DATED : February 16, 1988

INVENTOR(S) : Taichi KAWAKAMI et al

It is certified that error appears in the above-identified patent and that said Letters Patent is hereby corrected as shown below:

On the title page

AT ITEM 73: Please change Item 73 to read as follows:

--Assignees: Kabushiki Kaisha Kawakami Tekkosho, Ashikaga, Japan; Nippon Kayaku Kabushiki Kaisha, Tokyo, Japan--

Signed and Sealed this

Eighth Day of November, 1988

Attest:

DONALD J. QUIGG

Attesting Officer

Commissioner of Patents and Trademarks